Figure 1:
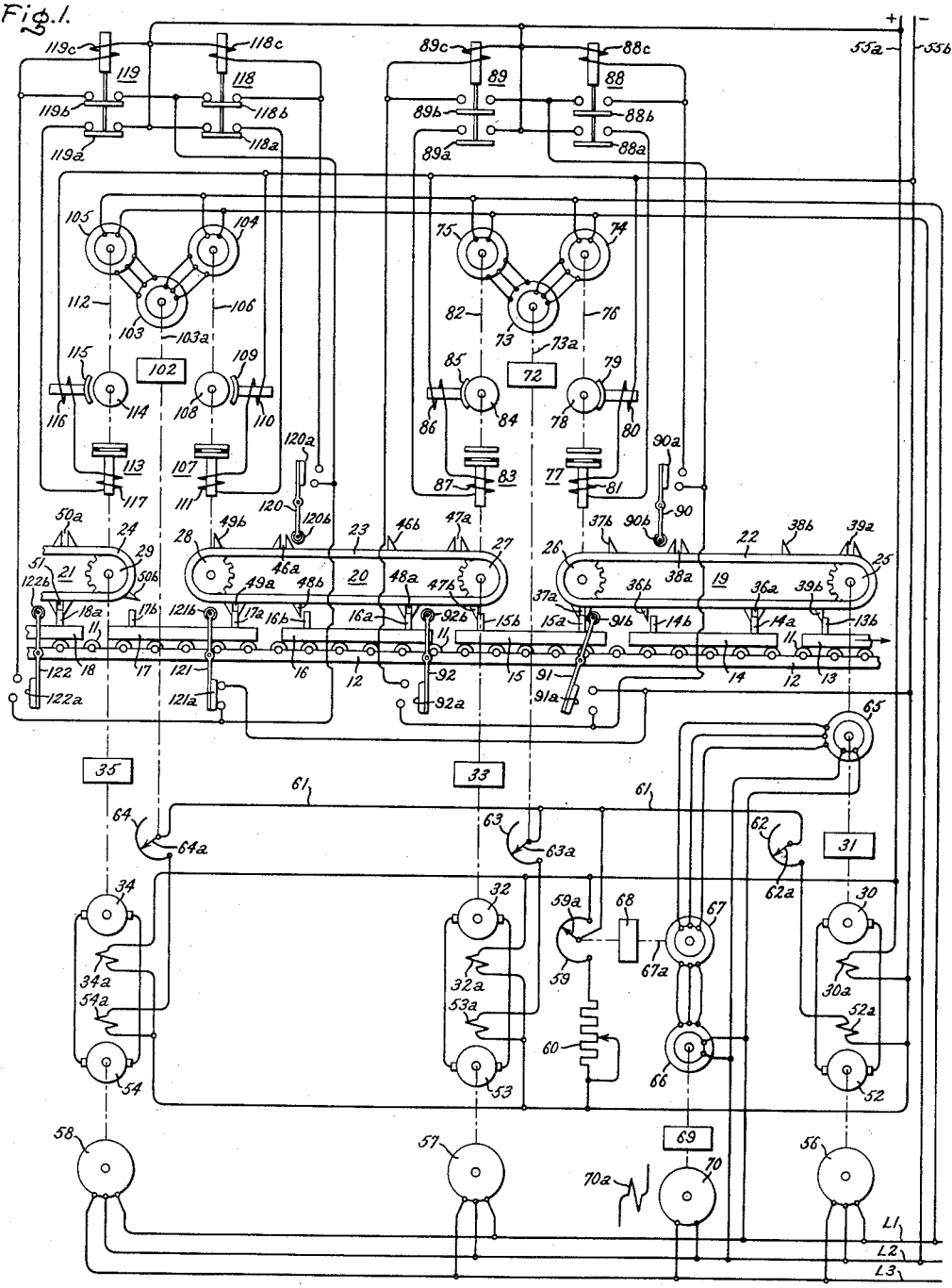

May 26, 1959

C. W. CHAPMAN 2,888,129

CONTROL SYSTEM FOR CONVEYING APPARATUS

Filed Dec. 16, 1955

2 Sheets-Sheet 1

Inventor:
Charles W. Chapman,
by J. Wesley Hauber
His Attorney.

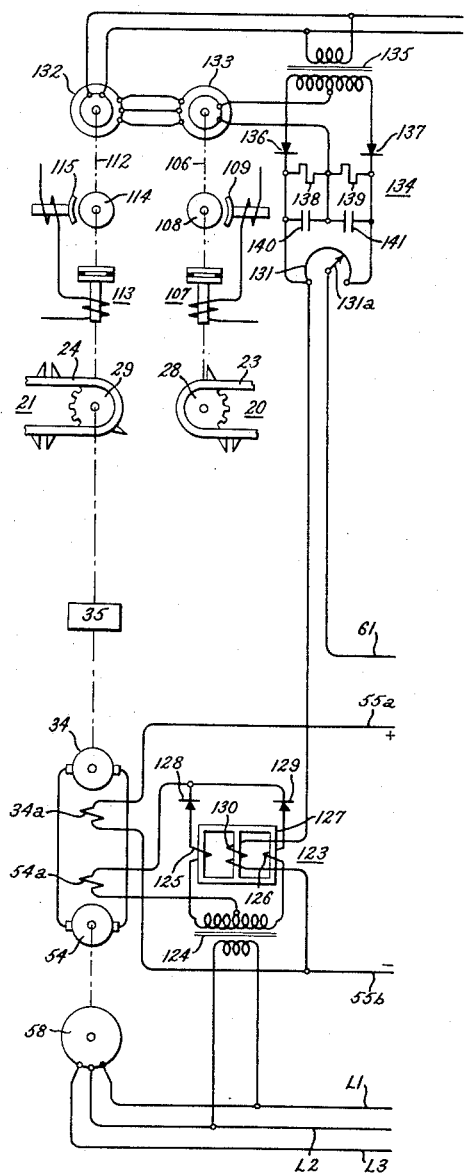

United States Patent Office 2,888,129
Patented May 26, 1959

2,888,129

CONTROL SYSTEM FOR CONVEYING APPARATUS

Charles W. Chapman, Schenectady, N.Y., assignor to General Electric Company, a corporation of New York Application December 16, 1955, Serial No. 553,631

10 Claims. (Cl. 198—82)

This invention relates to control systems for conveying apparatus, and more particularly to a control system for obtaining proper material transfer between two mechanically independent material moving conveyors.

In material conveying apparatus of the type employing a succession of mechanically independent conveyors, it is necessary that appropriately spaced material guiding elements on adjacent conveyors be in positional agreement at the moment material is to be transferred from the incoming conveyor to the receiving conveyor. Where there is equal spacing between successive elements on each conveyor, the required accurate positional relationship conventionally is obtained by operating the two adjacent conveyors in synchronism with each other and by providing speed control means to correct for any temporary relative displacement between corresponding elements. However, such conventional method is not entirely saisfactory if the spacing between successive elements is variable.

Accordingly, it is an object of this invention to provide a control system for assuring proper material transfer between adjacent conveyors having material guiding elemetns whose spacing may not be equal.

It is a further object of this invention to provide a conveying apparatus control system intermittently operable to vary conveyor speed as necessary to assure proper material transfer between adjacent conveyors.

Another object of the invention is to provide an improved conveying apparatus control system which is extremely flexible and which is substantially insensitive to temperature variations and load changes.

In carrying out my invention in one form, incoming and receiving mechanically independent material moving conveyors are arranged for material transfer from a predetermined segment of the incoming conveyor to a predetermined segment of the receiving conveyor. Separate driving means are provided to drive each conveyor at normal speed. The segments move along associated predetermined paths which include corresponding spaced apart reference and transfer points. In connection with each conveyor I provide separate means operable only while the associated predetermined segment is moving from reference to transfer points for coupling the associated conveyor to motion translating means. The motion translating means actuates control means to vary from normal the speed of one of the driving means in accordance with the positional disagreement between the predetermined segments thereby to correct for such disagreement and assure that both segments will arrive simultaneously at their associated transfer points.

Other objects and advantages of my invention will be apparent from the following decription taken in conjunction with the accompanying drawings in which Fig. 1 is a schematic representation of conveying apparatus utilizing a control system which embodies my invention in one form; and Fig. 2 is a schematic representation of a modification of the control system shown in Fig. 1 in accordance with another embodiment of the invention.

Fig. 1 illustrates in elevation a plurality of laterally disposed horizontal cylindrical rollers 11 each pivotally mounted on a stationary member 12 to form a bed for material flow. A series of independent carriages 13–18 inclusive are arranged to slide over the rollers 11 from left to right as viewed in the drawings. Each carriage comprises a framework suitable for supporting material which is to be moved by the conveying apparatus. The carriages are provided with front arms 14a, 15a, 16a, 17a and 18a which extend transversely from their respective front ends and with rear arms 13b ,14b, 15b, 16b and 17b which extend transversely from their respective rear ends. These arms are utilized to impart motion to the carriages.

Disposed above the carriages 13–18 illustrated emmodiments of my invention is conveying apparatus including a series of mechanically independent conveyors 19, 20 and 21 each comprising an endless chain or belt, 22, 23 and 24 respectively. Only a portion of conveyor 21 is included among the conveying apparatus components illustrated in Fig. 1. The conveyor chains 22 and 23 are disposed on head and tail sprockets 25 and 26 and 27 and 28 respectively, each sprocket being pivotally mounted in a horizontal plane on a suitable fixed support, not shown. A similar head sprocket 29 is shown for conveyor chain 24. The head sprockets 25, 27 and 29 are driven by means of motors 30, 32 and 34 operating through suitable fixed-ratio speed changing gear mechanisms represented in Fig. 1 by boxes 31, 33 and 35 respectively. The head sprockets are rotated by the driving motors in a counterclockwise direction as viewed in the drawings.

Disposed and predetermined and not necessarily equally spaced apart segments of conveyor chain 22 are four pairs of front and rear material guiding elements or dogs 36a and 36b, 37a and 37b, 38a and 38b, and 39a and 39b. Similarly disposed on predetermined and not necessarily equally spaced apart segments of conveyor chain 23 are four pairs of front and rear material guiding elements or dogs 46a and 46b, 47a and 47b, 48a and 48b, and 49a and 49b. The portion of conveyor chain 24 shown in Fig. 1 contains spaced apart front and rear dogs 50a and 50b and also front dog 51. Each front dog comprises a pair of laterally disposed spaced apart fingers defining a slot into which the front arm of each carriage will freely slide. With a front dog and front arm thus engaged, a material transporting carriage is propelled over rollers 11 from left to right, as viewed in Fig. 1, in response to movement of the conveyor chain. The spacing between the front and rear dogs of each pair is slightly greater than the spacing between front and rear arms of each carriage. A rear dog engages a rear arm and propels a carriage only after the corresponding front dog has released the front arm, which situation occurs as the carriage is being transferred between successive conveyors.

Although I have shown an overhead type of conveying apparatus for the sake of illustration, it should be understood that my invention is applicable also to other types of conveyors, such as a floor type. Similarly, instead of the series of rollers shown, each carriage could be equipped with its own wheels, or the carriages could be supported by an overhead rail and trolley arrangement.

Each conveyor dog has a path of movement determined by the disposition of the associated conveyor chain. The distance along this path between successive front dogs is coordinated with the carriage length so that the desired gap is maintained between adjacent material units or carriages as they are moved in succession along rollers 11. The rate at which carriages are moved is determined by the aforesaid distance between successive front dogs and by the speed at which the conveyor chains are operated. The speed of operation is controlled by the driving motors.

Each motor 30, 32 and 34 is preferably a conventional direct current motor whose speed is determined by the magnitude of voltage applied to its armature. The motors are provided with shunt field windings 30a, 32a and 34a respectively, and the shunt fields are energized from a suitable source of substantially constant direct voltage. The source of direct voltage is represented in the drawings by positive and negative buses 55a and 55b. In the illustrated embodiment of my invention, three direct current generators 52, 53 and 54 are individually electrically connected to motors 30, 32 and 34 respectively. The generators are driven at substantially constant speed by suitable driving means such as induction motors 56, 57 and 58 respectively. These induction motors are supplied from a suitable source of 3-phase electric power represented in Fig. 1 by supply lines L1, L2 and L3.

To control the voltage output of generators 52, 53 and 54 and thus the speed of driving motors 30, 32 and 34, the generators are provided with shunt field windings 52a, 53a and 54a respectively, each winding being energized by an adjustable amount of direct current. A potentiometer 59 and a tapped resistor 60 are connected in series circuit relation across the positive and negative buses 55a and 55b, and a slider 59a of potentiometer 59 is connected to a conductor 61. In the embodiment of my invention illustrated in Fig. 1, the generator field windings 52a, 53a and 54a are connected in series circuit relationship with rheostats 62, 63 and 64 respectively, between the negative bus 55b and conductor 61. Thus, movement of sliders 62a, 62b or 62c of rheostats 62, 63 and 64 respectively will vary the excitation of generators 52, 53 or 54 respectively. Similarly, the excitation of all three generators is controlled jointly by the setting of potentiometer slider 59a which determines the potential of conductor 61 with respect to negative bus.

The resulting separate and joint control over the speed of driving motors 30, 32 and 34 could be achieved by alternate means, not shown, such as, for example, an arrangement wherein a single motor-generator set supplies direct voltage for all three motors and individual speed control is obtained by providing separate means to vary the energization of each motor field winding.

As shown in Fig. 1, the position of slider 59a of potentiometer 59 is determined by motion translating means comprising three self-synchronous machines 65, 66 and 67 which are well known in the art as selsyns. A selsyn is essentially a wound-rotor induction motor having 3-wire stator windings and either two or 3-wire rotor windings. The machines 65 and 66 are identical transmitter selsyns or generators having their 2-wire windings connected in parallel across supply lines L1 and L2. Machine 67 is a differential selsyn or motor whose 3-wire rotor windings are interconnected with the stator windings of transmitter 65 and whose stator windings are interconnected with the stator windings of transmitter 66. An output rotor 67a of differential selsyn 67 is connected through a suitable gear and torque-limiting mechanism represented by a box 68 to the potentiometer slider 59a, and thus the position of slider 59a is changed in response to movement of rotor 67a. The rotor of transmitter 65 is positively coupled to the shaft by which motor 30 drives head sprocket 25, whereby this rotor moves in positional accord with movement of conveyor chain 22. The rotor of transmitter 66 is driven by suitable master reference means including an adjustable ratio transmission represented by box 69.

As can be seen in Fig. 1, the master reference means includes a single-phase synchronous motor 70 which is supplied with alternating current and voltage from supply lines L2 and L3. A shunt field winding 70a, if used, is energized from a suitable source, not shown, of direct voltage. Motor 70 runs at a speed in synchronism with the constant frequency of the 3-phase alternating electric power source. The adjustable ratio transmission 69 can be of any suitable type capable of controlled ratio adjustment, and thus the rotor of transmitter 66 is driven at a predetermined constant speed which is a fixed proportion of the speed of motor 70. It should be understood that I do not wish my invention to be limited by the particular master reference means illustrated in Fig. 1, since other arrangements would be equally suitable. For example, movement of the rotor of transmitter 66 might be controlled by the speed or position of equipment, not shown, which receives the material transporting carriages 13-18 as they are delivered by conveyor 19.

Voltages dependent upon the positions of the respective rotors are induced in the stator windings of both transmitters 65 and 66. As long as both rotors are moving in positional correspondence, i.e., in identical angular position-time relationship, the two sets of induced voltages are equal. Under this condition, the differential selsyn 67 produces a null output and its rotor 67a will be in a neutral stationary position. The connection between rotor 67a and slider 59a is initially adjusted whereby slider 59a will assume a mid-position with respect to potentiometer 59 when rotor 67a is in its neutral position. Tapped resistor 60 and rheostat 62 are both adjusted so that with slider 59a in this mid-position, the generator 52 is properly excited to establish a driving speed which causes rotation of both the sprocket 25 and the rotor of transmitter selsyn 65 at a speed which exactly corresponds to the predetermined constant rotor speed of transmitter selsyn 66. Should sprocket 25 vary slightly from this predetermined constant speed, the rotor of transmitter 65 is no longer in positional correspondence with the rotor of transmitter 66, and the resulting physical displacement will be translated into unequal stator winding voltages. Consequently, torque is produced in the rotor of differential selsyn 67 which torque tends to move rotor 67a from its neutral position through an angle equal to the angular differential between the rotors of transmitters 65 and 66. The position of slider 59a is changed, and the excitation of generator 52 is accordingly varied thereby to adjust the speed of driving motor 30 until the discrepancy between the relative angular positions of the two transmitter rotors is corrected. With the rotors of transmitter selsyns 65 and 66 again in positional correspondence, the rotor of differential selsyn 67 will have assumed a new neutral position. It should be apparent, therefore, that the operating speed of conveyor chain 22 is determined by the speed of the master reference means which drives the rotor of transmitter selsyn 66.

In the embodiment of my invention illustrated in Fig. 1, the speeds of conveyor chains 23 and 24 are controlled respectively by control means comprising rheostats 63 and 64 the settings of which determine the speeds of driving motors 32 and 34 respectively. The slider 63a of rheostat 63 is positively connected through a suitable gear and torque-limiting mechanism represented by a box 72 single output rotor 73a of a differential selsyn 73. The rotor and stator windings of differential selsyn 73 are interconnected respectively with the stator windings of two transmitter selsyns 74 and 75. The rotor windings of transmitters 74 and 75 are connected in parallel to supply lines L1 and L2. Selsyns 73, 74 and 75 provide motion translating means similar in construction and operation to the selsyns 67, 66 and 65 described above. Thus, transmitters 74 and 75 translate the mechanical motion of their rotors into electrical quantities which are supplied to differential selsyn 73, and differential selsyn 73 responds thereto in a manner to move slider 63a thereby varying the speed of conveyor chain 23 in accordance with the angular differential between the rotors of transmitters 74 and 75.

The rotor of transmitter selsyn 74 is coupled by means including a rigid shaft 76 to the tail sprocket 26 of conveyor 19 for rotation directly in accordance with the movement of this conveyor. As shown in Fig. 1, shaft 76 is provided with clutch means 77 arranged to be normally disengaged whereby the rotor of transmitter 74 and tail sprocket 26 are normally disengaged or uncoupled. Shaft 76 is also provided with a brake drum 78, and a cooperating brake band 79 is disposed adjacent thereto. Brake band 79 is biased by suitable means, not shown, to an engaging position with drum 78 thereby normally to prevent motion of shaft 76. The brake band 79 can be released and clutch 77 positively engaged by simultaneous energization of suitable electroresponsive means comprising a pair of series connected solenoid-coils 80 and 81 respectively.

Similarly, the rotor of transmitter selsyn 75 is coupled by a rigid shaft 82 to the head sprocket 27 for rotation directly in accordance with the movement of conveyor 20. Shaft 82 is provided with clutch means 83 and a brake drum 84 in cooperation with a band 85. A pair of series connected solenoid-coils 86 and 87 are provided to release brake band 85 and positively engage clutch 83, respectively, when energized. The shaft-brake-clutch arrangement just described is not the only means for obtaining the desired coupling between selsyn transmitter rotors and conveyor sprockets. A system of idler chains and pulleys, for example, could be used in lieu thereof.

The energization of the coils 80, 81, 86 and 87, and consequently the operation of the motion translating means comprising selsyns 73–75, is controlled by intermittently operable switching means comprising a pair of auxiliary relays 88 and 89 of the electromagnetic attraction type in conjunction with three position indicating switches 90, 91 and 92. The series connected coils 80 and 81 are connected by means of a normally open contact 88a of relay 88 to positive and negative buses 55a and 55b which provide a source of energization. Contact 88a will close when an operating winding 88c of relay 88 is energized. Winding 88c is connected for energization across buses 55a and 55b by a circuit including a normally open contact 90a and a normally closed contact 91a of switches 90 and 91 respectively. A normally open seal-in contact 88b of relay 88 is connected in parallel with contact 90a, so that once energized, winding 88c can be maintained energized even though contact 90a should open.

Similarly, the series connected coils 86 and 87 are connected by means of a normally open contact 89a of relay 89 to positive and negative buses. Contact 89a is closed by energizing an operating winding 89c of relay 89. Winding 89c is connected for energization across buses 55a and 55b by a circuit including a normally open contact 92a of switch 92 and the normally closed contact 91a. A normally open seal-in contact 89b of relay 89 is connected across contact 92a, and once energized, winding 89c can be maintained energized even though contact 92a should open.

For the purposes of illustration, each of the position indicating switches 90, 91 and 92 has been shown as comprising an elongated member pivotally mounted intermediate its ends to a stationary support. The switch contacts 90a, 91a and 92a respectively are disposed at corresponding ends of the elongated members. At their opposite ends, these members are provided with rollers 90b, 91b and 92b respectively. As can be seen in Fig. 1, each switch is mounted adjacent a conveyor chain so that with the contact in its normal position, i.e., with contacts 90a and 92a open and contact 91a closed, the associated roller is located at a predetermined point in the path of movement of the associated front dogs. As each front dog passes this point, it engages the roller thereby tilting the switch to actuate the switch contact. Each of the switches 90 and 91 is arranged for periodic operation in response to the passing of successive front dogs 36a, 37a, 38a and 39a of the conveyor chain 22, while switch 92 is periodically operated in response to the passing of successive front dogs 46a, 47a, 48a and 49a of conveyor chain 23. All of the rear dogs are laterally offset so as not to operate the position indicating switches. The manner of selecting the predetermined locations of the position indicating switches will be explained in the description of operation which follows hereinafter. It should be apparent that the same position indicating function could be performed by other means, such as by suitable photo-electric or electronic means.

As shown in Fig. 1, a slider 64a of the rheostat 64 is connected through a suitable gear and torque-limiting mechanism represented by box 102 to the single output rotor 103a of the differential selsyn 103 of motion translating means. Differential selsyn 103 corresponds to the differential selsyn 73, and it responds to a corresponding control system comprising components and connections identical to those described in detail immediately above. Thus, two transmitter selsyns 104 and 105 are provided. The rotor of transmitter 104 is coupled by a rigid shaft 106 to the tail sprocket 28 of conveyor 20. Suitable clutch means 107 and brake means 108, 109 operated by series connected solenoid coils 111 and 110, respectively, provide means for connecting and disconnecting transmitter 104 and tail sprocket 28. Similarly, the rotor of transmitter 105 is coupled by a rigid shaft 112 to the head sprocket 29 of conveyor 21, and suitable clutch means 113 and brake means 114, 115 operated respectively by series connected solenoid coils 117 and 116 provide means for controlling this coupling. In this manner, slider 64a is moved to vary the speed of conveyor chain 24 in accordance with the positional displacement between the rotors of transmitter selsyns 104 and 105.

The energization of coils 110, 111, 116 and 117, and consequently the operation of the motion translating means comprising selsyns 103–105, is controlled by intermittently operable switching means comprising a pair of auxiliary relays 118 and 119 in conjunction with three position indicating switches 120, 121 and 122. The axiliary relays 118 and 119 have operating windings 118c and 119c respectively and pairs of normally open contacts 118a and 118b and 119a and 119b respectively. The position indicating switches 120 and 122 have normally open switch contacts 120a and 122a respectively, while position indicating switch 121 has a normally closed switch contact 121a. These switches include rollers 120b, 121b and 122b respectively. Switches 120 and 121 are disposed adjacent conveyor chain 23, and switch 122 is associated with conveyor chain 24. The electrical connections from the positive and negative buses 55a and 55b to coils 110, 111, 116 and 117, including the switch contacts 120a, 121a and 122a and the operating windings and various contacts of relays 118 and 119, correspond to the connections already described with reference to position indicating switches 90, 91 and 92, auxiliary relays 88 and 89, and solenoid coils 80, 81, 86 and 87.

From the foregoing detailed description of the elements and interconnections of the Fig. 1 embodiment of my control system, its mode of operation may now be readily followed. Rotation of head sprockets 25, 27 and 29 causes movement by conveyor chains 22, 23 and 24 respectively, and the respective dogs located upon predetermined segments of the conveyor chains propel material transporting carriages 13–18 along the bed of rollers 11. The object of the invention is to assure that the transfer of material between successive conveyors is successfully accomplished. To obtain a complete understanding of the invention, it will only be necessary to consider the transfer operation between one pair of successive conveyors, namely between conveyors 19 and 20.

As is apparent in Fig. 1, proper material transfer requires that incoming conveyor chain 23 propel a carriage until the front arm of the carriage reaches a predetermined position in the path of movement of receiving conveyor chain 22 just as a front dog of the receiving conveyor moves into that position. This predetermined position will be referred to as the receiving transfer point, i.e., the point at which a front dog of receiving conveyor 19 first comes into alignment with and engages the front arm of a carriage. Front dog 37a of conveyor 19 is at such a transfer point in Fig. 1. At the instant the front arm of a carriage reaches the receiving transfer point, the rear dog of the incoming conveyor, which dog has been propelling the carriage during transfer, is disposed in a known position which is located behind the receiving transfer point by a linear distancec orresponding to the space between front and rear arms of the carriage. The incoming conveyor front dog, which had propelled the carriage prior to transfer, is now located in a position determined by the distance between front and rear dogs. This latter position will be designated the incoming transfer point. Front dog 47a of conveyor 20 is at such a point in Fig. 1.

It should now be apparent that to obtain proper material transfer it is necessary for the corresponding front dogs of the receiving and incoming conveyors to arrive at their associated transfer points simultaneously. In other words, the front dogs must move in positional agreement past their respective transfer points. Toward this end, position indicating switch 91 is located at the receiving transfer point, while position indicating switch 90 s disposed at a reference point located a predetermined distance along the path of front dog movement in advance of the transfer point. The predetermined distance should ideally be equal to the smallest spacing between any two successive front dogs of either conveyor chain 22 or 23. Position indicating switch 92 is disposed at a similar reference point located in advance of the incoming transfer point by the same ideal predetermined distance. This distance assures that the switch 91 returns to its normal contact closed position before either switch 90 or 92 is actuated by a front dog, and at the same time it provides ample room for correcting any existing positional disagreement between the corresponding front dogs.

For the purposes of explanation, it will be assumed that conveyors 19 and 20 have identical normal operating speeds and that the distances between successive front dogs of each conveyor are variable with respect to a common normal spacing. Assume also that due to a variation in spacing the distance between front dogs 37a and 38a of conveyor chain 22 is shorter than the distance between the corresponding front dogs 47a and 48a of conveyor chain 23. Therefore, before front dog 48a has reached the reference part of incoming conveyor 20, the front dog 38a reaches its reference point thereby actuating position indicating switch 90. Front dog 47a has now passed beyond position indicating switch 91 and contact 91a has returned to its normal closed position. Actuation of switch 90 to close contact 90a thereby energizes operating winding 88c which causes contacts 88a and 88b of auxiliary relay 88 to close. Contact 88a completes the energization circuit of solenoid coils 80 and 81, thereby instantly releasing brake 78, 79 and effecting engagement of clutch 77. Shaft 76 and thus the rotor of transmitter selsyn 74 begin to rotate in accordance with the movement of conveyor chain 22. Seal-in contact 88b maintains coils 80 and 81 energized after front dog 38a has passed beyond its reference point and switch contact 90a has returned to its normal open position.

Since shaft 82 is not rotating when the above described operation occurs, rotor 73a of differential selsyn 73 is turned in positional correspondence with the rotor of transmitter 74 thereby accurately reflecting the positional displacement between the stationary rotor of transmitter 75 and the moving rotor of transmitter 74 at each instant of time. The rheostat slider 63a, being connected to the rotor 73a, is moved in response to this output of the motion translating means in a direction to increase the speed of driving motor 32 and thus increase the speed of incoming conveyor 20.

When front dog 48a reaches the reference point of incoming conveyor 20, position indicating switch 92 is operated to close contact 92a. As a result, operating winding 89c is energized and auxiliary relay contacts 89a and 89b are closed. Contact 89a completes the energization circuit of solenoid coils 86 and 87 thereby instantly releasing brake 84, 85 and effecting engagement of clutch 83. Shaft 82 and thus the rotor of transmitter selsyn 75 begin to rotate in accordance with the movement of conveyor chain 23. Seal-in contact 89b maintains coils 86 and 87 energized after front dog 48a has passed beyond its reference point and switch contact 92a has returned to its normal open position.

The relative angular displacement between the rotors of transmitters 74 and 75 at the instant shaft 82 begins rotation, and throughout the period when both of the front dogs 38a and 48a are moving away from their respective reference points toward their respective transfer points, is an accurate measurement of the actual positional displacement or disagreement between these corresponding dogs. This displacement is represented by the position of the output rotor 73a of the differential selsyn. Because the speed of incoming conveyor 20 has been increased to correct for positional displacement, the positional disagreement between the dogs is gradually reduced and the rotor 73a returns toward its neutral position. Thus, the speed of conveyor 20 is gradually restored to normal. By the time the front dogs 38a and 48a reach their respective transfer points they are in positional agreement and there is no longer any angular differential between the transmitter rotors. Thus the front dogs 38a and 48a arrive simultaneously at their transfer points, the output rotor 73a of the motion translating means is now in its neutral or null position, and the incoming and receiving conveyors are again operating at normal speed.

Upon passing its transfer position, dog 38a operates position indicating switch 91 which opens contact 91a thereby deenergizing solenoid coils 80, 81, 86, and 87. The clutches and brakes of shafts 76 and 82 instantly return to their normal positions whereby these two shafts are uncoupled from the respective conveyors and are held in fixed positional agreement in readiness for the next transfer operation. By periodically rendering the motion translating means inoperable in this manner, the entire control system is maintained in an inactive state until a succeeding front dog of one of the conveyors passes its associated reference point.

The operation of the control system as described above insures that the corresponding front dogs of incoming and receiving conveyors are moving in positional agreement at their respective transfer points regardless of variations in dog spacing and regardless of prior changes in the speed of either conveyor. Intermittently the speed of the incoming conveyor is varied as necessary to correct for actual positional disagreement, regardless of whether such disagreement is the result of a variation in dog spacing or a change from normal operating speed. It should be noted that as an alternative the incoming conveyor may be used as the reference and the receiving conveyor could serve as the controlled conveyor. Since the speed matching effect is obtained in response to the actual physical locations of the front dogs as they move from reference to transfer points, the system is substantially unaffected by temperature variations and load changes.

My invention is particularly flexible and can be applied with similar success where the adjacent conveyors operate at different normal speeds and have different normal dog spacings. In such event it would be necessary to add an appropriate gear box or the like between conveyor sprocket and transmitter rotor and to locate the reference points at different but appropriately corresponding distances ahead of the respective transfer points.

Turning now to the embodiment of my invention shown in Fig. 2, it can be seen that an alternative means has been employed for varying the speed of a conveyor in a manner to assure proper material transfer between adjacent conveyors. Fig. 2 includes only that portion of the conveying apparatus necessary to adequately illustrate the principles of this embodiment. For the sake of convenience and orientation, the elements of the conveying apparatus which correspond to elements shown in Fig. 1 have been assigned identical reference characters. Thus, the head sprocket 29 of conveyor 21 and the tail sprocket 28 of conveyor 20 are indicated in Fig. 2. Conveyor 21 is driven by motor 34 through gear box 35, and the speed of motor 34 is controlled in accordance with the excitation of generator 54. The excitation of generator 54 is determined by control means comprising a magnetic amplifier 123.

A conventional self-saturating magnetic amplifier 123 has been shown in Fig. 2 for purposes of illustration. A transformer 124 supplied with alternating voltage from supply lines L1 and L2 is provided with a mid-tapped secondary winding. Opposite terminals of the secondary winding are connected to load windings 125 and 126, respectively, disposed on the outer legs of a 3-legged saturable core 127. The windings 125 and 126 are in turn connected through half-wave rectifiers 128 and 129 respectively to one terminal of the generator field winding 54a. The other terminal of winding 54a is returned to the mid-tap of the transformer secondary winding. Energization of a control winding 130 disposed on the center leg of the saturable core 127 will control in a conventional manner the degree of initial magnetization and thus the amount of direct current supplied to field winding 54a by magnetic amplifier 123. Control winding 130 is energized in accordance with the potential between negative bus and conductor 61 plus a preselected portion of an error voltage appearing across a potentiometer 131. The portion of error voltage is selected by a slider 131a. By changing the error voltage across potentiometer 131, the energization of winding 130 is increased or decreased and the excitation of generator 54 is accordingly varied thereby to control the speed of driving motor 34 and thus to control the speed of conveyor chain 24.

To obtain the error voltage, I provide motion translating means comprising a pair of selsyns 132 and 133 and a phase discriminating circuit 134 as shown in Fig. 2. Selsyn 132 is a transmitter or generator identical to the transmitter 105 described hereinbefore. The rotor of this transmitter is coupled by the rigid shaft 112, brake means 114, 115, and clutch means 113 to the head sprocket 29 of the conveyor 21. The rotor winding of transmitter 132 is connected to a suitable source of single-phase constant alternating voltage.

Selsyn 133 is a control transformer having 3-wire stator windings interconnected with the stator windings of transmitter 132. The rotor of control transformer 133 is coupled by the rigid shaft 106, brake means 108, 109, and clutch means 107 to the tail sprocket 28 of conveyor 20. A 2-wire rotor winding of control transformer 133 is positively connected to the phase discriminating circuit 134. The amplitude of the single alternating voltage induced in this winding is a function of the amount of relative angular displacement between the rotors of the transmitter and control transformer selsyns. The induced voltage is either in phase or 180 degrees out-of-phase in relation to the constant alternating voltage supplied to the rotor winding of transmitter 132, depending upon the relative direction of the angular displacement between rotors. As long as the two rotors are in positional correspondence, no output voltage is produced by control transformer 133.

The phase discriminating circuit 134 converts the output voltage of control transformer 133 into a unidirectional error voltage having a polarity which reflects the phase relationship of the output voltage relative to the constant alternating voltage and thus indicates the direction of angular displacement. As shown in Fig. 2, a transformer 135 supplied with the single-phase constant alternating voltage is provided with a mid-tapped secondary winding. Opposite terminals of the secondary winding are connected to half-wave rectifiers 136 and 137, respectively. The rectifiers 136 and 137 are in turn connected through resistors 138 and 139 respectively to one terminal of the rotor winding of control transformer 133. The other terminal of this winding is connected to the mid-tap of the transformer secondary winding. Smoothing capacitors 140 and 141 are connected in parallel with resistors 138 and 139 respectively, and potentiometer 131 is connected across the series combination of capacitors 140 and 141.

When the control transformer output voltage is zero, the phase discriminating circuit rectifies alternating voltage from transformer 135 to provide equal and opposite direct voltages across capacitors 140 and 141. The error voltage, which comprises the net voltage of capacitors 140 and 141, is zero. However, when output voltage is produced by control transformer 133, this voltage adds to alternate half cycles of voltage from transformer 135 and opposes the intermediate half cycles, and one of the smoothing capacitors is charged to a higher voltage level than the other. As a result, a D.-C. error voltage is produced. The magnitude of error voltage is a direct function of the amplitude of control transformer output voltage. Whichever capacitor 140 or 141 obtains the larger voltage, which is dependent upon which half wave of transformer 135 is aided by the control transformer output voltage, determines the polarity of the error voltage.

The preselected portion of error voltage adds to or subtracts from the direct voltage between conductor 61 and negative bus 55b to vary from normal the energization of magnetic amplifier control winding 130. Thus, transmitter 132 and control transformer 133 translate the mechanical motion of their rotors into an electric quantity which is operated upon by the phase discriminating circuit to affect the excitation of generator 54 thereby varying the speed of conveyor chain 24 in a manner to counteract any relative positional displacement between the rotors of transmitter 132 and control transformer 133. The operation of this embodiment of my invention to obtain proper material transfer is otherwise similar to the operation of the Fig. 1 embodiment previously described.

The setting of potentiometer slider 131a is a sensitivity adjustment to control the amount of speed change per degree of positional displacement. It may be desirable to use voltage limiting means, not shown, to limit to a safe value the maximum error voltage magnitude regardless of the amplitude of control transformer output voltage. In this manner the maximum correcting speed could be limited to a desired percentage of normal operating speed.

Although I have shown and described only two specific means for controlling conveyor speed, it will be understood by those skilled in the art that still other means could be employed to perform this function. For example, the differential selsyn illustrated in Fig. 1 could be used to operate a mechanical speed changing drive, or it could operate switch contacts by means of cams to control a correcting motor coupled to a differential gear arranged to change conveyor speed.

While I have shown and described preferred forms of my invention by way of illustration, many modifications will occur to those skilled in the art. I therefore contemplate by the appended claims to cover all such modifications as fall within the true spirit and scope of the invention.

What I claim as new and desire to secure by Letters Patent of the United States is:

1. In a control system for a pair of mechanically independent conveyors each having a predetermined segment movable along a path including first and second relatively stationary spaced apart points, separate means for driving each conveyor, means responsive to any relative positional displacement between the predetermined segments throughout the period when both of the segments are moving from their associated first points toward their associated second points for varying the speed of one of said driving means until the segments are in positional agreement with respect to each other, whereby the predetermined segments will pass simultaneously their associated second points, and means responsive to one of the segments passing its associated second point for periodically inactivating said speed varying means.

2. In a control system for a pair of mechanically independent conveyors each having a predetermined segment, separate means for driving each conveyor, motion translating means operable only when coupled to the conveyors to produce a single output in response to positional disagreement between the predetermined conveyor segments, means for coupling said motions translating means to the conveyors only when at least one of the predetermined segments is moving between associated first and second relatively stationary spaced apart points, and control means responsive to the output of said motion translating means to vary the speed of one of said driving means as necessary to bring the predetermined segments into positional agreement with respect to each other, whereby the predetermined segments will arrive simultaneously at their associated second points.

3. In a control system for material conveying apparatus including a pair of conveyors one of which is arranged to receive material from the other when a predetermined segment of the one conveyor is in a predetermined position with respect to a predetermined segment of the other conveyor, mechanically independent means for driving each conveyor at normal speed, control means for varying the speed of one of said driving means, and means responsive to relative positional disagreement between said predetermined segments only during the period when both of said predetermined segments are moving respectively through corresponding predetermined distances in advance of their predetermined material transferring positions to actuate said control means for temporarily varying from normal the speed of said one driving means until said segments are brought into positional agreement.

4. In combination with two mechanically independent conveyors each including a predetermined segment having a predetermined path of movement, a pair of driving means coupled respectively to the two conveyors normally to move the predetermined segments in positional agreement with respect to each other, motion translating means effective only while the predetermined segments are moving from associated reference points to associated transfer points disposed along the respective paths of movement to produce a single output in response to any positional disagreement between the predetermined segments, and control means responsive to the output of said motion translating means to vary from normal the speed of one of said driving means in order to bring the segments into positional agreement.

5. In a control system for a pair of mechanically independent endless conveyors each having a predetermined segment, separate means for driving each conveyor, motion translating means, a pair of means associated respectively with the pair of conveyors and each being responsive to the associated predetermined segment moving between first and second relatively stationary spaced apart points for periodically coupling said motion translating means to the associated conveyor, and control means positively connected to said motion translating means and responsive to the operation thereof when coupled to the conveyors for varying the speed of one of said driving means as necessary to bring the predetermined segments into positional agreement with respect to each other, whereby the predetermined segments will arrive simultaneously at their associated second points.

6. A control system for a pair of mechanically independent material moving conveyors arranged for material transfer from a predetermined segment of one conveyor to a predetermined segment of the other conveyor comprising, separate means for driving each conveyor at normal speed, control means for varying from normal the speed of one of said driving means, motion translating means operable when coupled to the conveyors to actuate said control means in accordance with the relative positional displacement between the predetermined segments, and separate means for each conveyor responsive to movement of the associated predetermined segments through corresponding predetermined distances prior to material transfer to couple the associated conveyor to said motion translating means.

7. In a control system for material conveying apparatus including a pair of conveyors one of which is arranged to receive material from the other when a predetermined segment of the one conveyor is in a predetermined position with respect to a predetermined segment of the other conveyor, mechanically independent means for driving each conveyor at normal speed, control means for varying the speed of one of said driving means, a pair of normally disengaged coupling means, a pair of switching means responsive to movement of said predetermined segments respectively through corresponding predetermined distances in advance of their predetermined material transferring positions for effecting engagement of said pair of coupling means, and intermittently operable motion translating means coupled to the pair of conveyors by said coupling means and operable when both of said coupling means are engaged to actuate said control means for temporarily varying from normal the speed of said one driving means in response to relative positional disagreement between said predetermined segments.

8. In combination with two mechanically independent conveyors each including a predetermined segment having a predetermined path of movement, a pair of driving means coupled respectively to the two conveyors normally to move the predetermined segments in positional agreement with respect to each other, control means operable to vary from normal the speed of one of said driving means, separate normally disengaged coupling means associated with each conveyor and including electroresponsive means operable when energized to engage said coupling means, separate switching means for each coupling means responsive to movement of the associated conveyor segment past a reference point disposed along its path of movement for energizing the associated electroresponsive means and responsive to movement of the associated conveyor segment past a transfer point also disposed along its path of movement for deenergizing the associated electroresponsive means, and intermittently operable motion translating means coupled to the conveyors by said coupling means and responsive to positional differential between the predetermined segments for actuating said control means when at least one of said coupling means is engaged.

9. A control system for a pair of mechanically independent material moving conveyors arranged for material transfer between predetermined segments thereof comprising, separate means for driving each conveyor, first and second means adapted to be coupled to the conveyors, respectively, for rotation directly in accordance with the movement of the respective conveyors, differential means associated with said first and second means for producing an output representative of any angular differential therebetween, control means responsive to the output of said differential means for varying the speed of one of said driving means, and intermittently operable means effective only while the conveyor segments are moving through corresponding predetermined distances in advance of material transfer for respectively coupling said first and second means to the conveyors.

10. A control system for a pair of mechanically independent material moving conveyors arranged for material transfer from a predetermined segment of one conveyor to a predetermined segment of the other conveyor comprising, separate means for driving each conveyor at normal speed, first means driven by said one conveyor only when the first-mentioned predetermined segment is moving through a predetermined distance immediately prior to material transfer for movement directly in accordance with the movement of said one conveyor, second means driven by the other conveyor only when the second-mentioned predetermined segment is moving through a corresponding predetermined distance immediately prior to material transfer for movement directly in accordance with the movement of said other conveyor, differential means associated with said first and second means for producing an output representative of any relative positional displacement between said first and second means and hence representative of relative positional displacement between the predetermined segments while moving respectively through said predetermined distances, and control means responsive to the output of said differential means for varying from normal the speed of one said driving means in a manner tending to reduce said relative positional displacement between the predetermined segments.

References Cited in the file of this patent

UNITED STATES PATENTS

| | | |
|---|---|---|
| 2,117,484 | Lewellen et al. | May 17, 1938 |
| 2,808,922 | Lutman | Oct. 8, 1957 |